United States Patent
Wu et al.

(10) Patent No.: US 11,377,577 B2
(45) Date of Patent: Jul. 5, 2022

(54) PRESSURE SENSITIVE ADHESIVES

(71) Applicant: Arkema France, Colombes (FR)

(72) Inventors: Jinping Wu, Exton, PA (US); Xiaoxing Dong, West Chester, PA (US); Jin Lu, West Chester, PA (US)

(73) Assignee: Arkema France, Colombes (FR)

( * ) Notice: Subject to any disclaimer, the term of this patent is extended or adjusted under 35 U.S.C. 154(b) by 344 days.

(21) Appl. No.: 15/560,323

(22) PCT Filed: Mar. 17, 2016

(86) PCT No.: PCT/EP2016/055853
§ 371 (c)(1),
(2) Date: Sep. 21, 2017

(87) PCT Pub. No.: WO2016/150821
PCT Pub. Date: Sep. 29, 2016

(65) Prior Publication Data
US 2018/0051197 A1    Feb. 22, 2018

Related U.S. Application Data

(60) Provisional application No. 62/136,694, filed on Mar. 23, 2015.

(51) Int. Cl.
| | | |
|---|---|---|
| *C09J 175/16* | (2006.01) | |
| *C08F 290/06* | (2006.01) | |
| *B05D 3/06* | (2006.01) | |
| *C09D 175/16* | (2006.01) | |

(52) U.S. Cl.
CPC ............ *C09J 175/16* (2013.01); *B05D 3/067* (2013.01); *C08F 290/067* (2013.01); *C09D 175/16* (2013.01); *C08G 2170/40* (2013.01)

(58) Field of Classification Search
CPC .... C09J 175/16; B05D 3/067; C08F 290/067; C09D 175/16; C08G 2170/40
See application file for complete search history.

(56) References Cited

U.S. PATENT DOCUMENTS

| | | |
|---|---|---|
| 4,999,242 A | 3/1991 | Ishiwata et al. |
| 5,112,882 A | 5/1992 | Babu et al. |
| 5,308,887 A | 5/1994 | Ko et al. |
| 5,391,602 A | 2/1995 | Skoultchi |
| 5,686,504 A | 11/1997 | Ang |
| 5,879,759 A | 3/1999 | Zang |
| 5,900,473 A | 5/1999 | Acevedo et al. |
| 5,907,018 A | 5/1999 | Mazurek et al. |
| 6,180,200 B1 | 1/2001 | Ha et al. |
| 6,429,235 B1 | 8/2002 | Varlemann et al. |
| 7,166,649 B2 | 1/2007 | Day et al. |
| 7,268,173 B2 | 9/2007 | Graichen et al. |
| 7,932,302 B2 | 4/2011 | Lu et al. |
| 8,735,506 B2 | 5/2014 | Hammond et al. |
| 2003/0069323 A1 | 4/2003 | Varlemann et al. |
| 2004/0127594 A1 | 7/2004 | Yang et al. |
| 2005/0176842 A1 | 8/2005 | Graichen et al. |
| 2005/0209360 A1 | 9/2005 | Graichen et al. |
| 2006/0216523 A1 | 9/2006 | Takaki |
| 2008/0108721 A1 | 5/2008 | Ha et al. |
| 2008/0160300 A1 | 7/2008 | Hwang et al. |
| 2010/0056662 A1 | 3/2010 | Spyrou et al. |
| 2011/0054062 A1 | 3/2011 | DeSanto, Jr. et al. |
| 2012/0059087 A1 | 3/2012 | Koch et al. |
| 2012/0329900 A1 | 12/2012 | Liu et al. |
| 2013/0011683 A1* | 1/2013 | Busman .............. C09D 133/04 428/423.1 |
| 2013/0068386 A1 | 3/2013 | Lack et al. |
| 2014/0057101 A1 | 2/2014 | Koch et al. |

FOREIGN PATENT DOCUMENTS

WO    WO 2015/169644    11/2015

* cited by examiner

*Primary Examiner* — Robert S Walters, Jr.
(74) *Attorney, Agent, or Firm* — Christopher R. Lewis

(57) ABSTRACT

Pressure sensitive adhesive (PSA) compositions that include at least one urethane (meth)acrylate oligomer having a molecular weight between about 2,000 g/mol and about 50,000 g/mol and an OH number of from 0.01 mg KOH/g to 100 mg KOH/g, at least one mono (meth)acrylate functional monomer and at least one tackifying resin. The PSA systems may also optionally include other additives, such as at least one initiator system that includes at least one photo-initiator or free radical initiator. The PSA systems are liquid at a temperature of 25° C.±2° C. with a viscosity of 15,000 cPs or less and are adapted to form smooth, uniform coatings or films upon curing without the application of heat, whereby the resulting films have advantageous properties with respect to peel strength, tack and shear resistance. In embodiments, the PSA systems include less than 1 wt % of solvent and less than 1 wt % of water or are free of solvent and are free of water.

21 Claims, No Drawings

PRESSURE SENSITIVE ADHESIVES

CROSS-REFERENCE TO RELATED APPLICATIONS

This application is a U.S. national stage application under 35 U.S.C. § 371 of PCT/EP2016/055853, filed Mar. 17, 2016, which claims benefit to U.S. patent application No. 62/136,694, filed Mar. 23, 2015.

FIELD OF THE INVENTION

Embodiments described herein are directed to curable, substantially solvent-free and substantially water-free pressure-sensitive adhesive (PSA) systems. Embodiments described herein are also directed to PSA systems that comprise a) at least one urethane (meth)acrylate oligomer in a range of 30% to 75% by weight, b) at least one mono (meth)acrylate functional monomer in a range of 10% to 60% by weight, c) at least one tackifying resin in a range of 1% to 50% by weight and optional ingredients d) at least an initiator system up to 5%, such as at least one photo-initiator in a range of 0.1% to 5% by weight, e) at least one multifunctional monomer up to 5%, f) at least one wetting agent up to 3% and g) other additives. The PSA systems are curable and may be disposed on a substrate, such as a metal or plastic substrate. Embodiments described herein are advantageous with respect to properties such as peel strength, tack, shear resistance and curing time.

BACKGROUND OF THE INVENTION

UV-curable pressure sensitive adhesives are generally based on acrylic, styrenic block copolymers or urethane chemistry, which have certain drawbacks during processing and film-forming. Acrylic based PSA systems are usually hot-melt type adhesive systems, solvent-based adhesive systems or water-based adhesive systems that facilitate a coating process. Solvent-based PSA systems contain volatile organic compounds, which are difficult to evaporate. Such difficulty limits their application due to environmental and performance requirements. Hot-melt type adhesive systems require heating to form the adhesive and also have limitation in performance, such as poor shear and peel properties at high temperature.

U.S. Pat. No. 7,166,649 discloses pressure sensitive compositions, which are UV-cured reaction products of polyester-polyether based urethane acrylates, one or more acrylate monomers and UV photo-initiators. In this case, a copolymer system is needed to achieve target performance.

U.S. Pat. No. 7,268,173 and U.S. Published Patent Application Nos. 2005/0209360 and 2005/0176842 disclose radiation curable solvent-free and printable precursors of pressure sensitive adhesives comprising: (i) one or more mono (meth)acrylate functional oligomer compounds, at least one of said oligomer compounds comprising at least one urethane bond; (ii) one or more poly (meth)acrylate functional oligomer compounds; (iii) one or more monomer compounds comprising ethylenically unsaturated groups and (iv) free radiation photo-initiators.

U.S. Pat. No. 8,735,506 discloses processes for making UV-curable pressure sensitive adhesive compositions by derivatizing an acrylic polymer with a derivatizing agent prepared from a hydroxy-functional acrylate monomer and diisocyanate.

U.S. Pat. No. 6,180,200 discloses cationic and hybrid radiation-curable pressure sensitive adhesive compositions for bonding digital versatile discs comprising at least one radiation-curable acrylate oligomer, reactive diluent, free radiation photo-initiator, epoxy resin, diol, cationic photo-initiator and mercaptopropyltrimethoxysilane.

U.S. Pat. No. 5,391,602 discloses radiation curable pressure-sensitive adhesive compositions comprising a polyurethane backbone capped with an acrylic or methacrylic reactive terminating group and the residue of a mono-ol or polyol non-reactive terminating group, also containing a thiol compound. The polyurethane backbone comprises residues of a polyoxypropylene diol or a polyoxyethylene diol.

U.S. Pat. No. 5,112,882 discloses pressure sensitive adhesive compositions comprising one or more poly(alphaolefin) homopolymers, copolymers, terpolymers and tetrapolymers derived from monomers containing 6 to 10 carbon atoms and photoactive crosslinking agents. The compositions are free of sulfur. The pressure sensitive adhesives are useful in pressure sensitive adhesive tapes, in articles containing transfer adhesive films and as the bonding material between supports in a laminated structure.

U.S. Pat. No. 5,686,504 discloses pigmented, UV-cured acrylic based pressure sensitive adhesives and methods for making same. The adhesives comprise an acrylic copolymer compounded with pigment and a hydrogen abstracting photo-initiator. A tackifier and/or multifunctional acrylate or methacrylate can also be added. High cohesive strength was achieved through the combination of tertiary amine functional groups and hydrogen abstracting photo-initiators.

U.S. Pat. No. 7,932,302 discloses radiation curable adhesive compositions comprising from about 20 wt % to about 90 wt % of one or more oligomers/polymer(s) comprising a urethane extended backbone formed by reacting diisocyanates with polyols derived from rubber oligomers/polymers, together with from about 10 wt % to about 80 wt % of one or more tackifier(s). A process for making pressure sensitive adhesives, wherein a radiation curable composition is applied to a substrate and then subjected to electromagnetic radiation is also disclosed. The oligomers were supplied at 60 wt % solution in toluene.

U.S. Pat. No. 4,999,242 discloses radiation-curable pressure sensitive adhesive tapes which comprises a radiation curable adhesive layer that is formed on a radiation-transmitting substrate containing 100 parts by weight of an acrylic adhesive, 5 to 500 parts by weight of a compound having a carbon-carbon double bond and 0.01 to 20 parts by weight of a silicone acrylate compound.

U.S. Published Patent Application No. 2012/0059087 discloses pressure sensitive adhesives produced from epoxidized naturally occurring oils or fast and reaction with at least one multifunctional agent selected from the group consisting of alcohols, amines, amino alcohols and combinations thereof. U.S. Published Patent Application No. 2012/0059087 also provides pressure sensitive adhesives formed by these methods.

U.S. Published Patent Application No. 2014/0057101 discloses pressure sensitive adhesive compositions including products made from reacting an epoxidized naturally occurring oil or fat with a dimer acid. The precursor was coated onto a carrier and cured via UV-radiation to form a pressure sensitive adhesive.

U.S. Pat. No. 5,308,887 discloses radiation curable pressure sensitive adhesive compositions based on silicone/acrylics and adhesives tapes prepared therefrom. The adhesive compositions comprise from 5 parts to 95 parts by weight of acrylic monomer wherein said acrylic monomer, 95 parts to 5 parts by weight of silicon pressure sensitive adhesives preferably comprises the intercondensation product of a silanol functional polydiorganosiloxane and a silanol functional copolymerical silicone, 0 to 5 parts by weight of a photo-initiator and 0 to 5 parts by weight of a cross-linker.

U.S. Published Patent Application No. 2008/0108721 discloses photo-curable pressure sensitive adhesive compositions including about 35% to about 65% by weight of the acrylic binder resin including a cellulose compound and an acrylic monomer, 25% to 60% by weight of acrylate oligomer compound, 1% to 20% of a curing agent and 1% to 5% of photo-initiator. Solvent was used during the adhesive synthesis and casting.

U.S. Published Patent Application No. 2011/0054062 discloses UV-pressure sensitive adhesives comprising a UV rosin-monomer blend, an acrylated urethane polyol, a TPDGA tripropylene glycol, a photo-initiator, a nonionic wetting agent and molecular deformer, a slip additive and deaerator and/or fragrance.

U.S. Published Patent Application No. 2008/0160300 discloses pressure sensitive adhesive compositions that include about 20 to about 150 parts by weight of the UV-curing acrylate per 100 parts by weight of the polymer binder resin and the UV-curing acrylate is a solid or near-solid at room temperature. The polymer binder resin is an acrylic resin having one or more of a hydroxy functional group, a carboxyl functional group, an epoxy functional group or an amine functional group. The solvent was included in the compositions.

U.S. Published Patent Application No. 2004/0127594 discloses curable pressure sensitive adhesive compositions comprising an acrylate copolymer, a mono-acrylate oligomer, a multi-acrylate oligomer having from 2 to 5 acrylate functional groups per molecule and a photo-initiator, the adhesive exhibiting pressure sensitive adhesive characteristics and forms at least a semi-interpenetrating polymer network when cured; wherein the semi-IPN has an average molecular weight between crosslinks (Mc) greater than about 3000 and the cured adhesive has a peel strength greater than about 40 N/dm.

U.S. Published Patent Application No. 2006/0216523 discloses pressure sensitive adhesive compositions for medical pressure-sensitive adhesive tapes, comprising a base polymer containing a pressure-sensitive adhesive polymer obtained by crosslinking or curing a precursor containing a urethane acrylate oligomer, an ultraviolet initiator and a plasticizer, the base polymer having a glass transition temperature, Tg, of 0° C. or less.

U.S. Published Patent Application No. 2003/0069323 discloses energy-curable polymer-forming compositions for making pressure sensitive adhesives including an unsaturated oligomer resin and an adhesive promoter. The compositions also include a tackifier and various other optional components such as photo-initiators, chain extenders, reactive diluents and the like.

U.S. Pat. No. 5,907,018 discloses acrylate/silicone pressure-sensitive adhesive compositions comprising about 25 to about 99 weight percent of silicone polymer having ethylenic unsaturation and about 1 to about 75 weight percent free radically polymerizable vinyl monomer which is capable of copolymerizing with the polymer and a sufficient amount of a silicate tackifying resin. The adhesives have improved adhesion to painted surfaces and low temperature performance.

U.S. Published Patent Application No. 2012/0329900 discloses cationic UV-cross-linkable acrylic polymers for pressure sensitive adhesives comprising an acrylic copolymer and a cationic photo-initiator. The acrylic copolymer comprises pendant reactive functional groups. The pressure sensitive adhesives formed from the acrylic copolymer with the pendant reactive functional group results in high green strength and/or high temperature hold strength of adhesive.

U.S. Published Patent Application No. 2013/0068386 discloses radiation-cross-linkable hot-melt adhesives containing more than 35%, relative to the hot-melt adhesive, of polyurethane polymers which contain at least one radiation polymerizable reactive group.

U.S. Pat. No. 5,879,759 discloses a two-step method for the production of pressure sensitive adhesives by radiation curing. The method comprises the steps of initially irradiating a monomer composition comprised of 65 to 100 percent by weight of monomers having a Tg<0° C., to form a coatable syrup, followed by adding at least one monomer having a Tg>0° C. and at least one multifunctional monomer or oligomer to said syrup and further irradiating the mixture to form a PSA.

U.S. Pat. No. 6,429,235 discloses energy-curable polymer forming compositions for making pressure sensitive adhesives, which include unsaturated oligomer resins and adhesive promoters which increase the peel strength of the adhesives without reducing the tack. The compositions also include a tackifier and various other optional components such as photo-initiators, chain extenders, reactive diluents and the like. U.S. Pat. No. 6,429,235 discloses adhesive promoters that can increase both peel and shear properties.

U.S. Pat. No. 5,900,473 discloses radiation curable pressure sensitive adhesives comprising the reaction product of a blend of at least two hydroxy polyesters having different Tgs and at least one prepolymer functionalized with (meth) acrylates, isocyanates and combinations thereof. U.S. Pat. No. 5,900,473 also defines the Tg of two different polyesters. U.S. Pat. No. 5,900,473 discloses better performance of using two different polyester polyol than using one type polyester polyol in removable PSA applications.

SUMMARY OF THE INVENTION

Radiation curable PSA systems offer many advantages over known PSA systems, such as fast curing time, good processability and environmental safety. However, it has been very challenging to develop curable PSA systems that realize the advantages of high tack properties, high peel properties as well as good shear properties. Thus, there is a need for curable PSA systems that realize such advantages.

Embodiments of the disclosed curable PSA systems or the curable compositions according to the present invention overcome at least some of the drawbacks associated with known PSA systems.

In embodiments, PSA systems (meaning also: or curable compositions) are described which comprise: at least one urethane (meth)acrylate oligomer; at least one mono (meth) acrylate functional monomer and at least one tackifying resin having a softening temperature of 80° C. or less and optionally, at least one component selected from the group consisting of photo-initiators, multifunctional monomers, wetting agents, adhesion promoters, fillers, rheology modifiers, thixotropic agents, plasticizers, UV-absorbers, UV-stabilizing agents, dispersants, antioxidants, antistatic agents, lubricants, opacifying agents, anti-foam agents, rheology agents and the like and combinations thereof.

In embodiments, the PSA systems comprise a) at least one urethane (meth)acrylate oligomer in a range of about 30 to about 75 wt %. In embodiments, the at least one urethane (meth)acrylate oligomer comprises a urethane (meth)acrylate according to formula (I) below,

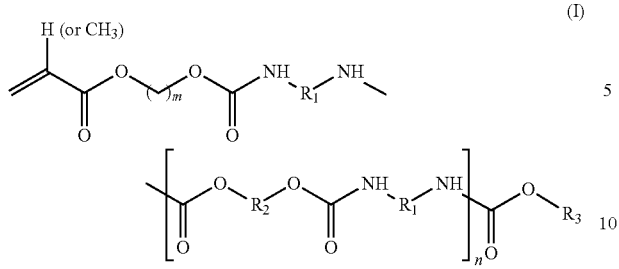

(I)

wherein 2≤n≤20, preferably 3≤n≤10 and 2≤m≤4; $R_1$ being a diisocyanate radical selected from the group consisting of alkylene, cycloalkylene, arylene, arylalkylene and combinations thereof; $R_2$ being a diol radical selected from the group consisting of alkylenes, cycloalkylenes, arylalkylenes and combinations thereof; $R_3$ comprises a moiety of $R_4$—OH such that a) has a mean OH value of about 0.01 mg KOH/g to about 100 mg KOH/g and $R_3$ comprises a moiety of —$R_5$-(meth)acryloyl, preferably such that component a) has an average in number functionality of from 1.1 to 1.9, more preferably from 1.2 to 1.8 (meth)acrylates and even more preferably from 1.3 to 1.7 (meth)acrylates; $R_4$ and $R_5$ being a bivalent radical selected from the group consisting of alkylenes, cycloalkylenes, arylalkylenes and combinations thereof and more particularly the at least one urethane (meth)acrylate oligomer a) has an average in number molecular weight Mn of from about 2,000 g/mol to about 50,000 g/mol.

In embodiments, the at least one urethane (meth)acrylate oligomer a) may be derived from, meaning made from or obtained from, polyethers, polyesters, polycarbonates diols or their mixtures. In embodiments, the at least one urethane (meth)acrylate oligomer may be derived from polyesters including poly-condensation polyesters resulting from reaction of: 1) polyols and carboxylic polyacids and 2) anhydrides and polyesters resulting from ring opening polymerization of lactones, such as caprolactone.

In embodiments, the at least one urethane (meth)acrylate oligomer a) may have an average in number functionality, in (meth)acrylates, of from about 1.1 to about 1.9. In embodiments, the at least one urethane (meth)acrylate oligomer a) may have a molecular weight Mn of from about 8,000 g/mol to about 25,000 g/mol and a mean OH value from about 0.01 mg KOH/g to about 100 mg KOH/g.

In embodiments, the PSA systems include at least one mono (meth)acrylate functional monomer in a range of about 10 to about 60 wt % and selected from the group consisting of alkoxylated tetrahydrofurfuryl acrylate, isobornyl acrylate, tetrahydrofurfuryl acrylate, caprolactone acrylate, 2(2-ethoxyethoxy) ethyl acrylate, 2-phenoxyethyl acrylate, tetrahydrofurfuryl methacrylate, isooctyl acrylate, 2-octyl acrylate, 2-ethylhexyl acrylate and combinations thereof.

In embodiments, the PSA systems include at least one tackifying resin in a range of about 1 to about 50 wt % and selected from the group consisting of Sylvatac® RE 25, Sylvatac® RE 40, Sylvalite® RE 10L, Sylvalite® 80HP (Arizona Chemical), Teckros® HRL and Teckros® RL5 (Teckrez).

In embodiments, the PSA systems include at least one photo-initiator and are curable with radiant energy, wherein the photo-initiator may be selected from the group consisting of α-hydroxyketones, phenylglyoxylates, benzyldimethylketals, α-aminoketones, mono-acyl phosphines, bis-acyl phosphines, phosphine oxides, metallocenes and combinations thereof. In embodiments, the at least one photo-initiator may be 1-hydroxy-cyclohexyl-phenyl-ketone.

In embodiments, the PSA systems do not include any initiator and are curable with electron beam energy. In embodiments, the PSA systems include at least one free radical initiator and/or accelerator and are curable chemically. The at least one free radical initiator may comprise a peroxide or hydro-peroxide and the accelerator may comprise tertiary amines or other reducing agents based on metal salts.

In embodiments, the PSA systems have a glass transition temperature, Tg, of about 20° C. or less when cured or about 10° C. or less when cured. The Tg is measured by Dynamic mechanical analysis at a frequency of 1 Hz and heating rate of 3° C./min. In embodiments, the PSA systems are liquid at a temperature of 25° C.±2° C. with a viscosity of 15,000 cP (mPa·s) or less. In embodiments, the PSA systems comprise less than 1 wt % of solvent and less than 1 wt % of water or are free of solvent and are free of water. In embodiments, a film or coating may be formed by the PSA systems.

In embodiments, methods of coating substrates may comprise applying the PSA systems to a substrate and curing the adhesive, wherein the applying comprises applying the PSA systems at ambient temperature. In embodiments, the substrate may be a high surface energy substrate, such as a metal or a low surface energy substrate, such as plastic. In embodiments, the PSA systems may be applied to a substrate by spraying, knife coating, roller coating, casting, drum coating, dipping and the like and combinations thereof. In embodiments, the curing may comprise curing by exposure to one of the group consisting of visible radiation, UV radiation, LED radiation, laser radiation, electron-beam radiation, peroxide, accelerator and heat. In embodiments, the curing comprises combinations of these curing techniques.

In embodiments, a pressure-sensitive adhesive may be made or prepared from the PSA systems described herein. In embodiments, a cured product may be made or prepared from the PSA systems described herein. In embodiments, use may be made of the PSA systems described herein in in adhesives, particularly pressure sensitive adhesives.

In embodiments, the PSA systems comprise a) about 30 to 75% w/w of at least one (meth)acrylate-functional urethane oligomer having an average molecular weight ranging from 2,000 to 50,000 and an average in number (meth)acrylate functionality ranging from 1.2 to 1.9; b) up to 60% w/w of at least one mono (meth)acrylate functional monomer; c) up to 50% w/w of at least one alicyclic tackifying resin with a softening point temperature being lower than 40° C.; d) up to 5% of a free radical initiator system; e) up to 5% w/w of at least one multifunctional in (meth)acrylate monomer (meaning with functionality of at least 2) and f) up to 3% w/w of other additives.

Embodiments of the PSA systems described herein are adapted to form smooth, uniform coatings or films without the application of heat, whereby the coatings or films have advantageous properties with respect to peel strength, tack and shear resistance. Embodiments of the PSA systems described herein may find use as adhesive tapes, adhesive sheets or adhesive sprays and may find other use in product packaging and labeling, construction and medicine.

DETAILED DESCRIPTION OF THE INVENTION

The PSA systems described herein may comprise at least one urethane (meth)acrylate oligomer, at least one mono (meth)acrylate functional monomer and at least one tackifying resin. In embodiments, the a) at least one urethane (meth)acrylate oligomer, the b) at least one mono (meth) acrylate functional monomer and the c) at least one tackifying resin make up 100% by weight of the PSA systems described herein. The PSA systems may also optionally comprise other additives, such as an additive selected from the group consisting of photo-initiators, multifunctional monomers, wetting agents, adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents and the like and combinations thereof.

I—Urethane (Meth)Acrylate Oligomer a)

In embodiments, The PSA systems described herein may comprise at least one urethane (meth)acrylate oligomer. In embodiments, the at least one urethane (meth)acrylate oligomer comprises a mixture of at least two urethane (meth) acrylate oligomers with select chains terminated by two (meth)acryloyl groups and/or select chains terminated by one (meth)acryloyl group and one free OH group. In embodiments, the at least one urethane (meth)acrylate oligomer comprises a urethane (meth)acrylate according to formula (I):

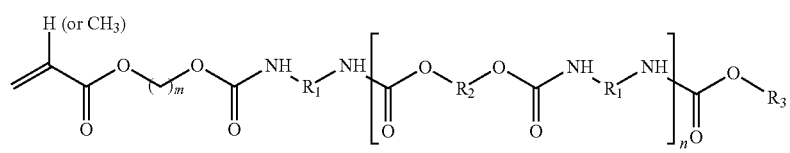

(I)

In embodiments, the at least one urethane (meth)acrylate oligomer may be a bio-based urethane oligomer. In embodiments, the at least one urethane (meth)acrylate oligomer may be derived from polyethers, polyesters, polycarbonates, polybutadienes, diols or from their mixtures. In embodiments, the at least one urethane (meth)acrylate oligomer may be derived from polyesters including poly-condensation polyesters resulting from reaction of: 1) polyols and carboxylic polyacids and 2) anhydrides and polyesters resulting from ring opening polymerization of lactones, such as caprolactone.

In embodiments, the at least one urethane (meth)acrylate oligomer has an n value (e.g., the number of urethane repeating units) from 2 to 20 or from 3 to 10 or from 3 to 5. Preferably, m (e.g., the number of methylene repeating units) may have a value from 2 to 4. The at least one urethane (meth)acrylate oligomer may have a backbone comprising free OH groups, wherein a mean OH value may be from about 0.01 mg KOH/g and about 100 mg KOH/g or from about 0.5 mg KOH/g to about 100 mg KOH/g or from about 1 mg KOH/g to about 50 mg KOH/g or from about 2 mg KOH/g to about 50 mg KOH/g or from about 3 mg KOH/g to about 10 mg KOH/g.

In embodiments, the at least one urethane (meth)acrylate oligomer has an average in number-functionality, in (meth) acrylates, of from about 1 to about 2 (meth)acrylates or from about 1.1 to about 1.9 (meth)acrylates or from about 1.2 to about 1.8 (meth)acrylates or from about 1.3 to about 1.7 (meth)acrylates or less than 2 (meth)acrylates. In some cases, the average in number functionality with respect to terminal (meth)acryloyl groups means that the complement to 2 of the global functionality does correspond to the OH group mean functionality.

In embodiments, $R_1$ may be a diisocyanate radical selected from the group consisting of alkylene, cycloalkylene, arylene, arylalkylene and combinations thereof; $R_2$ may be a diol radical selected from the group consisting of alkylenes, cycloalkylenes, arylalkylenes and combinations thereof; $R_3$ comprises a moiety of $R_4$—OH that has a mean OH value of about 0.01 mg KOH/g to about 100 mg KOH/g and $R_3$ comprises a moiety of —$R_5$-(meth)acryloyl; $R_4$ and $R_5$ being a bivalent radical selected from the group consisting of alkylenes, cycloalkylenes, arylalkylenes and combinations thereof.

In embodiments, the at least one urethane (meth)acrylate oligomer may have a molecular weight of from about 1,000 g/mol to about 200,000 g/mol or from about 2,000 g/mol to about 50,000 g/mol and preferably between about 5,000 g/mol and about 25,000 g/mol. In embodiments, the at least one urethane (meth)acrylate oligomer may be present in the adhesive composition at from about 5% to about 90% by weight or from about 10% to about 85% by weight or from about 20% to about 80% by weight or from about 30% to about 75% by weight or from about 40% to about 60% by weight.

II—Mono (Meth)Acrylate Functional Monomer b)

In embodiments, the at least one mono (meth)acrylate functional monomer may be present in the composition at from about 1% to about 80% by weight or from about 2% to about 75% by weight or from about 3% to about 70% by weight or from about 5% to about 65% by weight or from about 10% to about 60% by weight or from about 20% to about 40% by weight.

In embodiments, the at least one mono (meth)acrylate functional monomer may be selected from the group consisting of alkoxylated tetrahydrofurfuryl acrylate (SR611), isobornyl acrylate (SR506), tetrahydrofurfuryl acrylate (SR285), caprolactone acrylate (SR495B), 2-(2-ethoxyethoxy) ethyl acrylate (SR256), 2-phenoxyethyl acrylate (SR339), tetrahydrofurfuryl methacrylate (SR203), isooctyl acrylate (SR440), 2-octyl acrylate, 2-ethylhexyl acrylate and combinations thereof.

III—Tackifying Resin c)

In embodiments, the at least one tackifying resin may comprise a hydrogenated $C_4$ hydrocarbon resin (such as piperylene-based) or hydrogenated or non-hydrogenated rosin esters, including those modified by maleic anhydride rosin esters. In embodiments, the at least one tackifying resin is hydrogenated. In embodiments, the at least one tackifying resin has a softening temperature of 80° C. or less. In embodiments, the at least one tackifying resin may be present in the adhesive composition at from about 1% to about 50% by weight or from about 2% to about 35% by weight or from about 3% to about 25% by weight or from about 4% to about 15% by weight or from about 5% to about 10% by weight.

In embodiments, the at least one tackifying resin may be selected from the group consisting of Sylvatac® RE 25, Sylvatac® RE 40, Sylvalite® RE 10L, Sylvalite® 80HP (Arizona Chemical), Teckros® HRL and Teckros® RL5 (Teckrez).

IV—Other Additives

In embodiments, the PSA systems may also optionally comprise other additives, such as one or more of photo-initiators, multifunctional monomers, wetting agents, adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents and the like and combinations thereof may be included.

In embodiments, sufficient amounts of an initiator system comprising at least one photo-initiator may be optionally included in the compositions so as to render the compositions curable with radiant energy, such as UV light. Preferably, the compositions may include from about 0.1% by weight to about 20% by weight of the initiator system, preferably about 2% to about 15% by weight. Suitable photo-initiators for use in the compositions described herein may include compounds selected from the group consisting of α-hydroxyketones, phenylglyoxylates, benzyldimethylketals, α-aminoketones, mono-acyl phosphines, bis-acyl phosphines, phosphine oxides, metallocenes and combinations thereof. In embodiments, the at least one photo-initiator may be 1-hydroxy-cyclohexyl-phenyl-ketone.

In embodiments, the compositions described herein do not comprise any initiator and are rendered curable with electron beam energy.

In embodiments, sufficient amounts of an initiator system comprising at least one free radical initiator and/or accelerator may be optionally included in the compositions so as to render the compositions as chemically curable. Preferably, the compositions may include from about 0.1% by weight to about 20% by weight of the initiator system, preferably about 2% to about 15% by weight. Suitable free radical initiators for use in the compositions described herein may include peroxides and hydro-peroxides and suitable accelerators may include tertiary amines or other reducing agents based on metal salts. Such chemical curing may also take place at lower temperatures when using accelerators.

In embodiments, sufficient amounts of at least one multifunctional monomer and/or wetting agent may be optionally included in the composition. Such additives may be present in the compositions described herein from about 0.1% by weight to about 20% by weight or from about 1% to about 10% by weight.

In embodiments, the PSA systems do not contain adhesion promoters and are free of adhesion promoters, as the systems themselves possess sufficient adhesion properties.

In embodiments, the compositions comprise less than 5% by weight of solvent and less than 5% by weight of water or less than 3% by weight of solvent and less than 3% by weight of water or less than 1% by weight of solvent and less than 1% by weight of water or less than 0.5% by weight of solvent and less than 0.5% by weight of water. Preferably, the compositions do not comprise any solvent and do not comprise any water. The solvents may be non-reactive solvents including ketones such as acetone or methyl ethyl ketone, alkyl acetates such as ethyl acetate or butyl acetate, alcohols such as isopropyl alcohol and ethanol, alkanes such as hexane, alkenes such as toluene and combinations thereof. By non-reactive solvents, it is meant solvents that are saturated and not available for participation in polymerization.

In embodiments, the PSA systems have a glass transition temperature, Tg, of about 20° C. or less when cured or about 10° C. or less when cured or about 0° C. or less when cured and may range from about 20° C. to about −30° C. when cured. The glass transition temperatures may be determined by the DMA method with a sweep rate of 3° C. per minute.

One subject of the present invention relates to a curable composition comprising:
a) 30 wt % to 75 wt %, preferably 40 wt % to 60 wt % of at least one urethane (meth)acrylate oligomer having an average in number molecular weight Mn (measured by GPC) of from 2,000 g/mol to 50,000 g/mol, preferably 5,000 g/mol to 25,000 g/mol;
b) about 10 wt % to 60 wt %, preferably 20 wt % to about 40 wt % of at least one mono (meth)acrylate functional monomer;
c) about 1 wt % to 50 wt %, preferably 2 wt % to 35 wt % of at least one tackifying resin; and optionally
d) up to 5 wt % of at least one initiator system;
e) up to 5 wt % of at least one multifunctional monomer;
f) up to 3 wt % of at least one wetting agent; and
g) other additives.
with the sum of % of a)+b)+c)+d)+e)+f)+g) being 100%.

The d) component is more particularly present and said d) at least one initiator system comprises at least one photo-initiator, preferably selected from the group consisting of α-hydroxyketones, phenylglyoxylates, benzyldimethylketals, α-aminoketones, mono-acyl phosphines, bis-acyl phosphines, phosphine oxides and metallocenes and combinations thereof and is preferably 1-hydroxy-cyclohexyl-phenyl ketone.

More particularly, components a)+b)+c) is equal to 100% by weight of the said curable composition which composition comprises only components a), b) and c).

The said curable composition can have a glass transition temperature Tg of 20° C. or less when cured, preferably of 0° C. or less when cured (Tg measured by Dynamic mechanical analysis experiments at a frequency of 1 Hz and heating rate of 3° C./min) or the said composition may be liquid at a temperature of 25° C.±2° C. and more particularly said composition comprises less than 1 wt % of non-reactive solvent and less than 1 wt % of water, preferably the composition being free of non-reactive solvent and being free of water.

The said other additives h) may be selected from the group consisting of matting agents, colorants, dyes, pigments, adhesion promoters, fillers, rheology modifiers, thixotropic agents, plasticizers, UV absorbers, UV stabilizing agents, dispersants, antioxidants, antistatic agents, lubricants, opacifying agents, anti-foam agents, rheology agents and combinations thereof.

The said tackifying resin c) preferably has a softening temperature of 80° C. or less measured by Ring and Ball method (like ASTM D6493). More particularly, said resin c) is selected from the group consisting of piperylene-based hydrocarbon resins which may be hydrogenated and hydrogenated or non-hydrogenated rosin esters, modified by maleic anhydride rosin esters, preferably the c) at least one tackifying resin is hydrogenated.

Preferably, said component b) at least one mono (meth) acrylate functional monomer is selected from the group consisting of alkoxylated tetrahydrofurfuryl acrylate, isobornyl acrylate, tetrahydrofurfuryl acrylate, caprolactone acrylate, 2(2-ethoxyethoxy) ethyl acrylate, 2-phenoxyethyl acrylate, tetrahydrofurfuryl methacrylate, isooctyl acrylate, 2-octyl acrylate, 2-ethylhexyl acrylate and combinations thereof and more preferably is alkoxylated tetrahydrofurfuryl acrylate and/or isobornyl acrylate.

More preferably, the said component a) at least one urethane (meth)acrylate comprises a urethane (meth)acrylate oligomer according to formula (I):

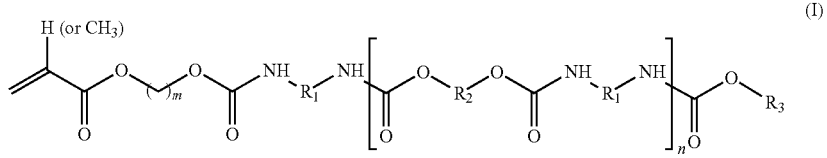

(I)

wherein 2≤n≤20, preferably 3≤n≤10 and 2≤m≤4;
$R_1$ being a diisocyanate radical selected from the group consisting of alkylene, cycloalkylene, arylene, arylalkylene and combinations thereof;
$R_2$ being a diol radical selected from the group consisting of alkylenes, cycloalkylenes and arylalkylenes;
$R_3$ comprises a moiety of $R_4$—OH such that component a) has a mean OH value of 2 mg KOH/g to 50 mg KOH/g, preferably 3 mg KOH/g to 10 mg KOH/g and $R_3$ comprises a moiety of —$R_5$-(meth)acryloyl such that component a) has an average in number functionality of from 1.2 to 1.8 (meth)acrylates, preferably from 1.3 to 1.7 (meth)acrylates; and
$R_4$ and $R_5$ being a bivalent radical selected from the group consisting of alkylenes, cycloalkylenes and arylalkylenes.

Preferably, the said curable composition according to the invention is an adhesive curable composition and more particularly a pressure sensitive adhesive curable composition.

The invention covers also a film which is formed by curing a curable composition as defined above according to the present invention.

Another subject of the invention relates to a method of coating a substrate comprising:
applying the curable composition as defined above according to the invention to a substrate and then curing the said curable composition.

The said curing preferably comprises curing by exposure to one of the group consisting of visible radiation, UV radiation, LED radiation, laser radiation, electron-beam radiation, peroxide, peroxide and an accelerator, heat and combinations thereof, more preferably by exposure to UV and/or visible radiation.

The said applying comprises applying by spraying, knife coating, roller coating, casting, drum coating, dipping and combinations thereof.

Another subject of the invention relates to a cured composition, which is obtained by the curing of a curable composition as defined above according to the present invention.

Preferably, said cured composition is a cured adhesive composition. Said cured composition may be also a cured coating composition.

A more specific subject of the present invention is a cured adhesive composition which is obtained by curing a curable composition as defined above according to the present invention which cured adhesive is preferably a pressure sensitive adhesive in the form of an adhesive tape, an adhesive sheet, an adhesive spray, a product package, a product label, a construction article or a medical product and more particularly said pressure sensitive adhesive is for packaging, labelling, construction, model making, medicine and construction applications.

The invention also covers the use of the curable composition of the present invention in adhesives and preferably in pressure sensitive adhesives.

Another subject of the invention relates to a final product which is a pressure sensitive adhesive, produced by using a curable composition as defined above according to the present invention.

In embodiments, the said curable compositions are liquid at a temperature of 25° C.±2° C. with a viscosity of less than 15,000 cPs or less than 12,500 cPs or less than 10,000 cPs. Such viscosity features facilitates spreading of the composition on a substrate for film formation. The compositions may be applied to a substrate in any known conventional manner, for example, by spraying, knife coating, roller coating, casting, drum coating, dipping and the like and combinations thereof. Indirect application to a substrate using a transfer process may also be used. The substrate may be any commercially relevant substrate, such as a high surface energy substrate or a low surface energy substrate, such as a metal substrate or plastic substrate, respectively. The substrates may comprise stainless steel, paper, cardboard, glass, polyolefins, PET, PVC, PMMA, PC, composites and wood.

In embodiments, methods for preparing a pressure sensitive adhesive film from the compositions described herein may comprise coating the composition on a substrate and curing the composition. The coating may take place at ambient temperature or near ambient temperature (such as in the range of 10-35° C.). In embodiments and once a layer of the pressure sensitive adhesive compositions described herein have been applied to a substrate, the layer may be cured. Curing may be carried out by at least three routes: 1) curing with a photo-initiator using radiant energy (such as UV light, visible light and/or LED light); 2) curing without any initiator using electron beam energy and 3) curing with chemicals (such as peroxides, hydro-peroxides) at low temperature with an accelerator (such as tertiary amines or another reducer based on metal salts).

The layer of the pressure sensitive adhesive compositions described herein may be exposed to energy for a time effective to cause cross-linking of the at least one urethane (meth)acrylate oligomer and the at least one mono (meth) acrylate functional monomer to cure the applied compositions. The intensity and/or wavelength may be adjusted as desired to achieve the desired extent of curing. The time period of exposure is not particularly limited, so long as the time period is effective to cure the compositions into a solid PSA film. Time frames for exposure to energy to cause sufficient cross-linking is not particularly limited and may be from at least about 5 seconds or at least about 30 seconds or at least about 1 minute or at least about 5 minutes or at least about 10 minutes.

The following parameters defined in the present invention are determined as follows:
Tgs: by Dynamic mechanical analysis at a frequency of 1 Hz and heating rate of 3° C./min
Mn values: by conventional GPC as disclosed below in more details.

The molecular weight Mn and polydispersity Mw/Mn are determined by conventional gel permeation chromatography (GPC). A small sample was dissolved in tetrahydrofuran (THF) and injected into a liquid chromatograph (Agilent 1100 Series) equipped with HP PLGel® GPC columns (5 um, 100 A, 250×4.6 mm; 3 um MiniMix-E, 250×4.6 mm and 5 um MiniMix-D, 250×4.6 mm). The components of the sample were separated by the GPC columns based on their molecular sizes in solution. The components were detected by a Hewlett-Packard 1047A® refractive index detector and recorded by Agilent HPLC Chemstation® and Polymer Laboratories GPC software. Polystyrene standards of known molecular weight and narrow dispersity were used to generate a calibration curve.

The OH value is determined by Radiometer TitraLab® TM865 Autotitrator. A 4-5 gram sample is dissolved in 25 ml tetrahydrofuran (THF), then 25 ml p-toluenesulfonyl isocyanate (TSI) reagent was added volumetrically and stirred for 10 minutes. The sample was then titrated with 0.25 M concentration tetrabutylammonium hydroxide. The results are reported in mg KOH/g by the autotitrator.

(Meth)acrylate average in number functionality of a) is the calculated theoretical functionality.

Softening point of tackifying resin c): by Ring and ball standard method, like ASTM D6493 currently used for hydrocarbon and rosin ester tackifying resins.

EXAMPLES

Table 1 provides structural characteristics for the oligomer according to a) (e.g., aliphatic polyester urethane acrylate 1, "Oligomer 1") of Examples 1-4 of the compositions described herein. The oligomer has a theoretical average in number-functionality of 1.6; an experimental mg KOH/g of 5.18; a molecular weight (GPC Mw) of 22,339 g/mol; a number average molecular weight (GPC Mn) of 9,189 g/mol and an equivalent molecular weight per acrylate of 5,743. In the compositions, n in formula (I) above is 4.

TABLE 1

Structural Characteristics of the Oligomer Used for Examples 1-4

| Example | Theoretical Functionality | Experimental OH# (mg KOH/g) | GPC Mn | GPC Mw | n | Equivalent Mn Per Acrylate |
|---|---|---|---|---|---|---|
| Oligomer 1 | 1.6 | 5.18 | 9,189 | 22,339 | 4 | 5743 |

The ingredients and their proportions (in wt %) for Examples 1-4 are provided below in Tables 2-5, respectively, along with the corresponding peel, tack and shear properties for each of Examples 1-4. In embodiments, the oligomers (e.g., urethane acrylates) may be contained in the compositions in a wt % range from about 40%-60%. In embodiments, the at least one mono (meth)acrylate functional monomer may be contained in the compositions in a wt % range from about 15%-40%. In embodiments, the tackifying resin may be contained in the compositions in a wt % range of about 5%-35%. In embodiments, the photoinitiator may be contained in the compositions in a wt % range of about 2%-3%.

Example 1

TABLE 2

Ingredients and Properties of Example 1

Adhesive Composition

| Ingredient | Amount (%) |
|---|---|
| a) Oligomer 1 (a) | 58.20 |
| b) Alkoxylated tetrahydrofurfuryl acrylate (b) | 35.90 |
| d) Irgacure ® 2022 (d) | 2.90 |
| c) Teckros ® HRL (tackifying resin c) | 3.00 |

Adhesive Properties

| Test | Performance |
|---|---|
| 180 Peel on stainless steel | 6.14 lb/in |
| 180 Peel on polypropylene | 6.05 lb/in |
| Probe tack | 1.35 lb |
| Shear (1" × 1", 1 kg) | 33 hrs |

Example 2

TABLE 3

Ingredients and Properties of Example 2

Adhesive Composition

| Ingredient | Amount (%) |
|---|---|
| a) Oligomer 1 (a) | 58.20 |
| b) Alkoxylated tetrahydrofurfuryl acrylate (b) | 21.34 |
| b) SR506A | 14.55 |
| d) Irgacure ® 2022 (d) | 2.91 |
| e) Sylvatac ®RE25 (c) | 3.00 |

Adhesive Properties

| Test | Performance |
|---|---|
| 180 Peel on stainless steel | 4.12 lb/in |
| 180 Peel on polypropylene | 4.76 lb/in |
| Probe tack | 1.86 lb |
| Shear (1" × 1", 1 kg) | 82 hrs |

Example 3

TABLE 4

Ingredients and Properties of Example 3

Adhesive Composition

| Ingredient | Amount (%) |
|---|---|
| a) Oligomer 1 (a) | 42.00 |
| b) Alkoxylated tetrahydrofurfuryl acrylate (b) | 15.40 |
| b) SR506A | 10.50 |
| d) Irgacure ® 2022 (d) | 2.10 |
| e) Sylvatac ®RE40 (c) | 30.00 |

TABLE 4-continued

Ingredients and Properties of Example 3

Adhesive Properties

| Test | Performance |
| --- | --- |
| 180 Peel on stainless steel | 6.41 lb/in |
| 180 Peel on polypropylene | 6.29 lb/in |
| Probe tack | 1.74 lb |
| Shear (1" × 1", 1 kg) | 29 hrs |

Example 4

TABLE 5

Ingredients and Properties of Example 4

Adhesive Composition

| Ingredient | Amount (%) |
| --- | --- |
| a) Oligomer 1 (a) | 45.00 |
| b) Alkoxylated tetrahydrofurfuryl acrylate (b) | 16.50 |
| b) SR506A | 11.25 |
| d) Irgacure ® 2022 (d) | 2.25 |
| e) Sylvatac ®RE40 (c) | 25.00 |

Adhesive Properties

| Test | Performance |
| --- | --- |
| 180 Peel on stainless steel | 5.5 lb/in |
| 180 Peel on polypropylene | 7.41 lb/in |
| Probe tack | 1.82 lb |
| Shear (1" × 1", 1 kg) | 30 hrs |

The following sample preparation and testing procedures were used in evaluating the performance of films prepared from the compositions according to Examples 1-4. Number average molecular weights were determined by GPC using polystyrene as a standard. The pressure sensitive adhesive compositions of Examples 1-4 were casted using a square drawdown directly onto the surface of 2 mil polyethylene terephthalate (PET) film. The pressure sensitive adhesive compositions of Examples 1-4 were cured under UV light using a 400-watts/inch mercury vapor lamp at curing energy about 1 mJ/cm². The pressure sensitive adhesive compositions of Examples 1-4 were then laminated onto a release liner. One-inch strips were cut for testing. Samples for 180° peel adhesion testing were prepared by applying a 1 inch strip of the samples to a standard stainless steel or polypropylene panel using a 4.5 pound automatic roller. The laminated samples were then allowed to dwell for 3 days at 72° F. (22.2° C.) and 50% humidity before testing. The peel strength was measured according to ASTM-D903-98 at an angle of 180° and a speed of 12 in/min. The tack was measured according to ASTM-D2979-95 using a probe tack tester PT-500 from ChemInstruments. One square inch of samples was used for probe tack test. The shear adhesion was measured according to ASTM 4498-95. Adhesive sample with 1 inch width and 3 inch length was used for shear testing. One square inch of adhesive was applied to the stainless steel panel and was then allowed to dwell for 1 hour before testing. 1 kg weight was then applied. The time when the sample failed and the weight dropped was recorded.

As can been seen, the pressure sensitive adhesive compositions of Examples 1-4 produced films that demonstrate good peel properties on both stainless steel and polypropylene substrates. For stainless steel substrates, the peel strength of the films of the pressure sensitive adhesive compositions of Examples 1-4 ranged from about 4.0 lb/in to about 6.5 lb/in. For polypropylene substrates, the peel strength of the films of the pressure sensitive adhesive compositions of Examples 1-4 ranged from about 4.75 lb/in to about 7.50 lb/in. As can also been seen, the pressure sensitive adhesive compositions of Examples 1-4 produced films that demonstrate good tack properties. The tack of the films of the pressure sensitive adhesive compositions of Examples 1-4 ranged from about 44 lb/in² to about 61 lb/in². As can further been seen, the pressure sensitive adhesive compositions of Examples 1-4 produced films that demonstrate good shear properties. The time it took for the 1 kg weight to drop was about 30 hours to about 82 hours for the films of the pressure sensitive adhesive compositions of Examples 1-4.

COMPARATIVE EXAMPLE

Table 6 provides structural characteristics for the oligomer (e.g., polyester urethane acrylate 2, "Oligomer 2") of Comparative Example 1. The oligomer is a di-functional urethane acrylate without free OH groups in the backbone.

TABLE 6

Structural Characteristics of the Oligomer Used for Comparative Example 1

| Comparative Example 1 | Theoretical Functionality | Experimental OH# (mg KOH/g) | GPC Mn | GPC Mw |
| --- | --- | --- | --- | --- |
| Oligomer 2 | 2.0 | 0.0 | 5,803 | 11,837 |

The oligomer has a theoretical average in number-functionality of 2; a molecular weight (GPC Mw) of 11,837 g/mol and a number average molecular weight (GPC Mn) of 5,803 g/mol.

Comparative Example 1 includes similar amounts (e.g., wt % values) of oligomers, (meth)acrylate functional monomers and tackifying resins as in Examples 1-4. Table 7 lists the ingredients and their weight % (wt %) values, along with properties, for Comparative Example 1. The oligomer (e.g., urethane acrylate oligomer 2) is contained in the composition in a wt % of 45%. The at least one (meth)acrylate functional monomer is contained in the composition in a wt % of about 28 wt %. The tackifying resin is contained in the composition in a wt % of 25%. The photo-initiator is contained in the composition in a wt % of 2.25%.

TABLE 7

Ingredients and Properties of Comparative Example 1

Adhesive Composition

| Ingredient | Amount (%) |
| --- | --- |
| Urethane acrylate Oligomer 2 | 45.00 |
| SR611 | 16.50 |
| SR506A | 11.25 |
| Irgacure ® 2022 | 2.25 |
| Sylvatac ® RE40 | 25.00 |

TABLE 7-continued

Ingredients and Properties of Comparative Example 1

Adhesive Properties

| Test | Performance |
| --- | --- |
| 180 Peel on stainless steel | 3.28 lb/in |
| 180 Peel on polypropylene | 2.73 lb/in |
| Probe tack | 2.35 lb |
| Shear (1" × 1", 1 kg) | 30 hrs |

The sample preparation and testing procedures that were used in evaluating the performance of films prepared from the composition according to Comparative Example 1 were the same as those described above for Examples 1-4. The pressure sensitive adhesive composition of Comparative Example 1 produced a film that did not perform as well as the films produced from the compositions of Examples 1-4, particularly with respect to peel strength and tack. For stainless steel substrates, the peel strength of the film of the pressure sensitive adhesive composition of Comparative Example 1 was about 3.3 lb/in, whereas for Examples 1-4 the peel strength ranged from about 4.0 lb/in to about 6.5 lb/in. For polypropylene substrates, the peel strength of the film of the pressure sensitive adhesive composition of Comparative Example 1 was about 2.7 lb/in, whereas for the Examples 1-4 the peel strength ranged from about 4.75 lb/in to about 7.50 lb/in. With respect to tack, the probe tack of the film of the pressure sensitive adhesive composition of Comparative Example 1 was 1.35 lb, whereas for Examples 1-4 the probe tack ranged from about 1.35 to about 1.88 lb.

When the word "about" is used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages.

It will now be apparent that a new, improved and non-obvious PSA systems has been described in this specification with sufficient particularity as to be understood by one of ordinary skill in the art. Moreover, it will be apparent to those skilled in the art that modifications, variations, substitutions, and equivalents exist for features of the PSA systems which do not materially depart from the spirit and scope of the embodiments disclosed herein. Accordingly, it is expressly intended that all such modifications, variations, substitutions, and equivalents which fall within the spirit and scope of the invention as defined by the appended claims shall be embraced by the appended claims.

The invention claimed is:

1. A curable composition comprising:
   a) about 30 wt % to 75 wt % of at least two urethane (meth)acrylate oligomers, each of said oligomers having an average in number molecular weight Mn of from 2,000 g/mol to 50,000 g/mol;
   b) about 10 wt % to 60 wt % of at least one mono (meth)acrylate functional monomer;
   c) about 1 wt % to 50 wt % of at least one tackifying resin; and
   d) up to 5 wt % of at least one initiator system;
   e) up to 5 wt % of at least one multifunctional monomer;
   f) up to 3 wt % of at least one wetting agent; and
   g) optionally, other additives,
   wherein the sum of percentages of a) + b) + c) + d) + e) + f) + g) is 100%; and
   wherein the at least two urethane (meth)acrylate oligomers have a mean OH value from 2 mg KOH/g to 50 mg KOH/g and an average in number-functionality of 1.2 to 1.8 (meth)acrylates.

2. The curable composition of claim 1, wherein the d) at least one initiator system comprises at least one photoinitiator selected from the group consisting of α-hydroxyketones, phenylglyoxylates, benzyldimethylketals, α-aminoketones, mono-acyl phosphines, bis-acyl phosphines, phosphine oxides and metallocenes and combinations thereof.

3. The curable composition of claim 1, wherein component a) has an average in number-functionality of from 1.3 to 1.7 (meth)acrylates.

4. The curable composition claim 1, wherein said composition has a glass transition temperature Tg of 20° C. or less when cured or wherein the composition is liquid at a temperature of 25° C. ±2° C.

5. The curable composition of claim 4, wherein the c) at least one tackifying resin c) is hydrogenated.

6. The curable composition of claim 1, wherein the composition comprises less than 1 wt % of non-reactive solvent and less than 1 wt % of water.

7. The curable composition of claim 1, wherein the c) at least one tackifying resin has a softening temperature of 80° C. or less.

8. The curable composition of claim 1, wherein the b) at least one mono (meth)acrylate functional monomer is selected from the group consisting of alkoxylated tetrahydrofurfuryl acrylate, isobornyl acrylate, tetrahydrofurfuryl acrylate, caprolactone acrylate, 2(2-ethoxyethoxy) ethyl acrylate, 2-phenoxyethyl acrylate, tetrahydrofurfuryl methacrylate, isooctyl acrylate, 2-octyl acrylate, 2-ethylhexyl acrylate and combinations thereof.

9. The curable composition of claim 1, wherein the c) at least one tackifying resin is selected from the group consisting of piperylene-based hydrocarbon resins which may be hydrogenated and hydrogenated or non-hydrogenated rosin esters, modified by maleic anhydride rosin esters.

10. The curable composition of claim 1, wherein said composition is an adhesive curable composition which is a pressure sensitive adhesive curable composition.

11. The curable composition of claim 1, wherein the b) at least one mono (meth)acrylate functional monomer is selected from the group consisting of alkoxylated tetrahydrofurfuryl acrylate and isobornyl acrylate.

12. The curable composition of claim 1, wherein each of said urethane (meth)acrylate oligomers a) has an average in number molecular weight Mn of from 5,000 g/mol to 25,000 g/mol.

13. The curable composition of claim 1, wherein the d) at least one initiator system comprises 1-hydroxy-cyclohexyl-phenyl ketone.

14. A film, wherein it is formed by curing a curable composition as defined in claim 1.

15. A method of coating a substrate comprising:
   applying the curable composition as defined in claim 1 to a substrate and then
   curing said curable composition, wherein the curing comprises curing by exposure to one of the group consisting of visible radiation, UV radiation, LED radiation, laser radiation, electron-beam radiation, peroxide, peroxide and an accelerator, heat and combinations thereof.

16. The method of claim 15, wherein the said applying comprises applying by spraying, knife coating, roller coating, casting, drum coating, dipping and combinations thereof.

17. A cured composition, wherein it is obtained by the curing of a curable composition as defined in claim 1.

18. The cured composition of claim 17, wherein it is a cured adhesive composition.

19. The cured composition of claim 17, wherein it is a cured coating composition.

20. The cured composition of claim 17, wherein said cured composition is a pressure sensitive adhesive in the form of an adhesive tape, an adhesive sheet, an adhesive spray, a product package, a product label, a construction article or a medical product.

21. The cured composition of claim 20, wherein it is for packaging, labelling, construction, model making, medicine and construction applications.

\* \* \* \* \*